(12) United States Patent
Yamaoka et al.

(10) Patent No.: US 12,204,128 B2
(45) Date of Patent: Jan. 21, 2025

(54) OPTICAL MEMBER, COMPOSITE OPTICAL MEMBER, AND LIGHTING DEVICE

(71) Applicant: NICHIA CORPORATION, Anan (JP)

(72) Inventors: Kensuke Yamaoka, Tokushima (JP); Hiroaki Kuroda, Anan (JP); Daisuke Sanga, Tokushima (JP)

(73) Assignee: NICHIA CORPORATION, Anan (JP)

( * ) Notice: Subject to any disclaimer, the term of this patent is extended or adjusted under 35 U.S.C. 154(b) by 73 days.

(21) Appl. No.: 18/156,855

(22) Filed: Jan. 19, 2023

(65) Prior Publication Data
US 2023/0228930 A1 Jul. 20, 2023

(30) Foreign Application Priority Data
Jan. 20, 2022 (JP) .................. 2022-007370

(51) Int. Cl.
F21V 8/00 (2006.01)
A01G 7/04 (2006.01)
C09K 11/61 (2006.01)
C09K 11/64 (2006.01)

(52) U.S. Cl.
CPC ............ *G02B 6/001* (2013.01); *A01G 7/045* (2013.01); *C09K 11/617* (2013.01); *C09K 11/645* (2013.01); *G02B 6/0006* (2013.01)

(58) Field of Classification Search
CPC .......... F21K 9/64; F21K 9/61; F21V 2200/30; F21V 8/00; A01G 7/04
See application file for complete search history.

(56) References Cited

U.S. PATENT DOCUMENTS

| | | | | |
|---|---|---|---|---|
| 4,933,815 A | * | 6/1990 | Parthasarathy | ...... G02B 6/0096 362/582 |
| 2006/0139946 A1 | | 6/2006 | Tamaki | |
| 2006/0171137 A1 | | 8/2006 | Tamaki | |
| 2007/0263405 A1 | * | 11/2007 | Ng | .............. F21K 9/69 362/555 |
| 2010/0053970 A1 | | 3/2010 | Sato et al. | |
| 2011/0163246 A1 | | 7/2011 | Ishiwata et al. | |
| 2012/0051377 A1 | | 3/2012 | Liang et al. | |
| 2012/0212931 A1 | | 8/2012 | Kinoshita et al. | |
| 2012/0243203 A1 | | 9/2012 | Koike et al. | |
| 2018/0356580 A1 | | 12/2018 | Onozuka | |
| 2019/0097092 A1 | | 3/2019 | Yamae | |
| 2019/0377229 A1 | | 12/2019 | Song et al. | |

FOREIGN PATENT DOCUMENTS

| | | |
|---|---|---|
| JP | H0452601 A | 2/1992 |
| JP | 2002148442 A | 5/2002 |
| JP | 2002163902 A | 6/2002 |
| JP | 2003257205 A | 9/2003 |
| JP | 2004200120 A | 7/2004 |
| JP | 2005093256 A | 4/2005 |

(Continued)

Primary Examiner — William J Carter
(74) Attorney, Agent, or Firm — Hunton Andrews Kurth LLP

(57) ABSTRACT

An optical member includes a first light guide member having an elongated shape and comprising an end surface and a lateral surface extending in a longitudinal direction from the end surface; and a wavelength conversion layer disposed on the lateral surface of the first light guide member and containing a phosphor.

32 Claims, 7 Drawing Sheets

(56) References Cited

FOREIGN PATENT DOCUMENTS

| | | | |
|---|---|---|---|
| JP | 2006100009 | A | 4/2006 |
| JP | 2006117857 | A | 5/2006 |
| JP | 2006179379 | A | 7/2006 |
| JP | 2006236974 | A | 9/2006 |
| JP | 2007227573 | A | 9/2007 |
| JP | 2008262743 | A | 10/2008 |
| JP | 2009043611 | A | 2/2009 |
| JP | 2009124720 | A | 6/2009 |
| JP | 2010056003 | A | 3/2010 |
| JP | 2010094109 | A | 4/2010 |
| JP | 2010153238 | A | 7/2010 |
| JP | 2011113689 | A | 6/2011 |
| JP | 2011249059 | A | 12/2011 |
| JP | 2012069908 | A | 4/2012 |
| JP | 2012074258 | A | 4/2012 |
| JP | 2012174551 | A | 9/2012 |
| JP | 2012203995 | A | 10/2012 |
| JP | 2015050148 | A | 3/2015 |
| JP | 2015163053 | A | 9/2015 |
| JP | 2018060719 | A | 4/2018 |
| JP | 2018205626 | A | 12/2018 |
| JP | 2019061796 | A | 4/2019 |
| JP | 2019215515 | A | 12/2019 |
| JP | 2020181210 | A | 11/2020 |

\* cited by examiner

OPTICAL MEMBER, COMPOSITE OPTICAL MEMBER, AND LIGHTING DEVICE

CROSS-REFERENCE TO RELATED APPLICATION

This application claims priority to Japanese Patent Application No. 2022-007370 filed on Jan. 20, 2022, the disclosure of which is hereby incorporated by reference in its entirety.

BACKGROUND

The present disclosure relates to an optical member, a composite optical member, and a lighting device.

Typically, a plurality of light sources are used to irradiate a certain area with light. For example, a light emitting system as described in JP 2015-163053 A is used for growing plants. The light emitting system described in JP 2015-163053 A employs spot lighting, and thus requires a plurality of light emitting devices to grow a large amount of plants.

SUMMARY

One exemplary object of the present disclosure is to provide a lighting device with reduced irradiation unevenness.

According to a first aspect of the present disclosure, an optical member includes a first light guide member having an elongated shape and including an end surface and a lateral surface extending in a longitudinal direction from the end surface, and a wavelength conversion layer disposed on the lateral surface of the first light guide member and containing a phosphor.

According to a second aspect of the present disclosure, a composite optical member includes the optical member and a second optical member configured to emit light having a wavelength different from a wavelength of the optical member, in which the second light guide member has an elongated shape and includes an end surface and a lateral surface extending in a longitudinal direction from the end surface.

According to a third aspect of the present disclosure, a lighting device includes the optical member or the composite optical member, and a light source facing an end surface of the optical member or an end surface of the composite optical member.

According to the present disclosure, a lighting device with reduction in unevenness in irradiation can be provided.

DETAILED DESCRIPTION

Figure 1:
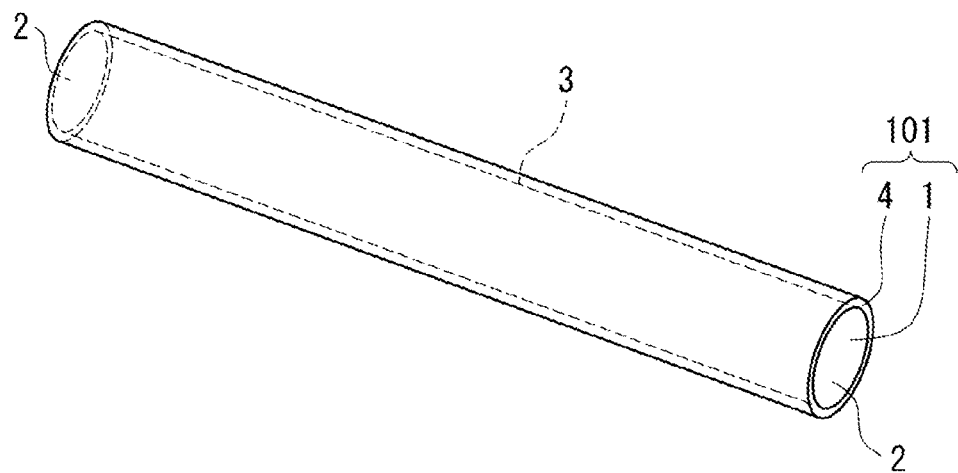
FIG. 1 is a schematic perspective view of an exemplary optical member according to a first embodiment.

Certain embodiments of the invention according to the present disclosure will be described below with reference to the accompanying drawings. The optical member, the composite optical member, and the lighting device described below are intended to give a concrete form to the technical idea of the invention according to the present disclosure, and the invention according to the present disclosure is not limited to the following description unless otherwise specified. In each drawing, members having identical functions may be denoted by the same reference signs. For ease of explanation or understanding, the exemplary embodiments and examples may be illustrated separately for convenience, but partial substitutions or combinations of the constituent components illustrated in different embodiments and examples are possible. In the embodiments and examples described below, descriptions of matters common to those already described will be omitted, and only different features will be described. In particular, similar effects of similar configurations will not be repeatedly described for individual embodiments. The size, positional relationship, etc., of the members illustrated in the drawings may be exaggerated in order to clarify explanation. In some cases, end views illustrating only cut surfaces may be used as cross-sectional views.

Optical Member

An optical member according to the present disclosure includes a first light guide member having an elongated shape and including an end surface and a lateral surface extending in a longitudinal direction from the end surface, and a wavelength conversion layer containing a phosphor and disposed on the lateral surface of the first light guide member.

For irradiating a wide area with light, a plurality of lighting devices are typically installed at positions facing the irradiation target, which may cause unevenness in irradiation. The optical member according to the present disclosure allows light to enter an end surface thereof and emits light through a large lateral surface thereof, which allows for irradiating the wide area with light with reduction in irradiation unevenness.

First Embodiment

A first embodiment according to the present disclosure relates to an optical member 101. The optical member 101 of the first embodiment according to the present disclosure is described with reference to FIG. 1. FIG. 1 is a schematic perspective view of an optical member 101.

As illustrated in FIG. 1, the optical member 101 of the first embodiment according to the present disclosure includes
a first light guide member 1 having an elongated shape, and including an end surface 2 and a lateral surface 3 extending in a longitudinal direction from the end surface 2, and
a wavelength conversion layer 4 disposed on the lateral surface 3 of the first light guide member 1 and containing a phosphor.

First Light Guide Member

The first light guide member 1 has an elongated shape and includes the end surface 2 and the lateral surface 3 extending in a longitudinal direction from the end surface 2.

As used herein, the term "elongated shape" refers to a shape having its length in the longitudinal direction longer than a length in any direction orthogonal to the longitudinal direction. The term "elongated shape" can include any appropriate shape as long as the longitudinal direction and the lateral direction of the shape can be distinguished, and can include, for example, cylindrical, prismatic, or the like. Typically, in the elongated shape, the longitudinal length is more than two times longer than a length in any direction orthogonal to the longitudinal direction.

In the present specification, the term "end surfaces" refers to surfaces located at both ends in the longitudinal direction of the elongated shape.

In the present specification, the term "lateral surface" refers to a surface extending in a longitudinal direction from the end surface. In other words, the lateral surface means the surface along the longitudinal direction described above. The expression "along the longitudinal direction" is not limited to a case in which the longitudinal direction is strictly parallel to the longitudinal direction, and may encompass a slight deviation. For example, about 20 degrees of deviation from the longitudinal direction may be acceptable.

The first light guide member 1 preferably has a cylindrical shape. The first light guide member 1 is not limited to have a cylindrical shape as long as the first light guide member 1 is in the elongated shape, and may have, for example, a prismatic shape, or more specifically, a plate shape. The first light guide member 1 having a cylindrical shape facilitates evenly emitting the guided light.

The first light guide member 1 may have any appropriate length, and may have a length of, for example, 5 cm or greater, 10 cm or greater, 50 cm or greater, 100 cm or greater, 150 cm or greater, or 200 cm or greater. The increased length of the first light guide member 1 allows irradiation of light in a wider area. The length of the first light guide member 1 may be, for example, 1000 cm or less, 500 cm or less, 300 cm or less, 200 cm or less, 100 cm or less, or 50 cm or less. Reduction in length of the first light guide member 1 can increase the intensity of light per unit area emitted from the first light guide member 1. The length of the first light guide member 1 can be appropriately set in consideration of the intensity of light entering the end surface and the intensity of light emitted from the lateral surface.

The length of the first light guide member 1 may be, for example, 5 cm or greater and 1000 cm or less, 10 cm or greater and 500 cm or less, 50 cm or greater and 300 cm or less, 50 cm or greater and 200 cm or less, 50 cm or greater and 100 cm or less, 100 cm or greater and 300 cm or less, or 100 cm or greater and 200 cm or less.

The phrase "length of the first light guide member 1" described above refers to a length in the longitudinal direction.

A ratio of the length to the equivalent circle diameter of the first light guide member 1 may be preferably 5 or greater, more preferably 10 or greater, and even more preferably 20 or greater, such as 30 or greater, 50 or greater, or 100 or greater. By increasing the ratio of the length of the first light guide member 1 to the equivalent circle diameter of the first light guide member 1, the first light guide member 1 becomes thinner, and the attenuation of light incident from the end surface 2 can be suppressed even at a distance from the end surface 2. The ratio of the length to the equivalent circle diameter of the first light guide member 1 may be preferably 1000 or less, more preferably 500 or less, and even more preferably 300 or less, such as 200 or less, 100 or less, or 50 or less. The reduced ratio of the length to the equivalent circle diameter of the first light guide member 1 makes the first light guide member 1 be thicker, and makes it possible to emit light widely in the width direction. The area of the end surface 2 that is the incident surface also increases, thus increasing the amount of the incident light. The ratio of the length of the first light guide member 1 to the equivalent circle diameter can be set as appropriate in consideration of the intensity of the light incident on the end surface 2 and the intensity of the light emitted from the lateral surface 3.

The ratio of the length of the first light guide member 1 to the equivalent circle diameter may be, for example, 5 or greater and 1000 or less, 10 or greater and 500 or less, 20 or greater and 300 or less, 20 or greater and 200 or less, 20 or greater and 100 or less, 30 or greater and 300 or less, 30 or greater and 200 or less, or 30 or greater and 100 or less.

The term "equivalent circle diameter" described above refers to a diameter of a circle having an area equal to the cross-sectional area of the first light guide member 1.

The surface of the first light guide member 1 preferably has a roughness which is sufficient to diffuse the guided light. The surface of the first light guide member 1 is preferably a lateral surface 3 of the first light guide member 1. By roughening the surface of the first light guide member 1, the light incident on the end surface 2 can easily be emitted from the lateral surface 3 of the first light guide member 1 to the outside.

A surface roughness (Ra) of the surface of the first light guide member 1 is preferably 0.2 or greater and 1.0 or less, and more preferably 0.2 or greater and 0.9 or less. With the surface roughness (Ra) of a surface of the first light guide member 1 in the range described above, the light incident on the end surface 2 can easily exit to the outside of the first light guide member 1.

It is preferable that the greater the distance from the end surface 2 on which light is to be incident, the greater the surface roughness of the surface of the first light guide member 1. In other words, the surface roughness of the surface of the first light guide member 1 increases as the distance from a light source increases. The larger the surface roughness of the surface of the first light guide member 1, the easier it is for the light incident on the end surface 2 to be emitted to the outside of the first light guide member 1. The light incident on the end surface 2 farther attenuates and the light emitted from the lateral surface 3 becomes weaker as the light travels further away from the end surface 2. However, by increasing the surface roughness of the surface of the first light guide member 1 as the distance from the end surface 2 increases, the proportion of light emitted from the lateral surface 3 at a distance from the end surface 2 increases, thus reducing the difference in intensity of light emitted from the first light guide member 1 in the longitudinal direction.

The first light guide member 1 is made of a resin material selected from, for example, a silicone resin, a silicone-modified resin, an epoxy resin, a phenol resin, a polycarbonate resin, an acrylic resin, a methylpentene resin, or a polynorbornene resin. A glass material such as quartz glass or the like may also be used as the material constituting the first light guide member 1.

Wavelength Conversion Layer

The wavelength conversion layer 4 includes a phosphor, and is disposed on the lateral surface 3 of the first light guide member 1.

In the optical member 101 illustrated in FIG. 1, the wavelength conversion layer 4 is disposed over the entire region from one end to the other end of the first light guide member 1, that is, over the entire longitudinal direction of the first light guide member 1, but the arrangement of the wavelength conversion layer 4 is not limited thereto.

The wavelength conversion layer 4 may be disposed in a region between one end or its vicinity and the other end or its vicinity of the first light guide member 1. The term "vicinity" may mean, for example, a region not including an end of the first light guide member, and extends for a predetermined distance from the end. The predetermined distance from the end may be, for example, 10 cm or less, 5 cm or less, 3 cm or less, or 1 cm or less.

Figure 2A:
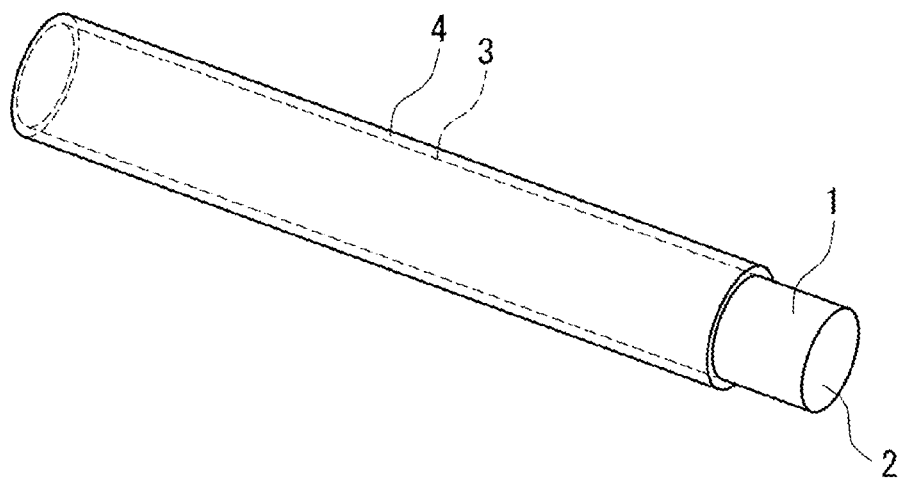
FIG. 2A is a schematic perspective view illustrating an exemplary arrangement of a wavelength conversion layer in an exemplary optical member according to the first embodiment.
Figure 2B:
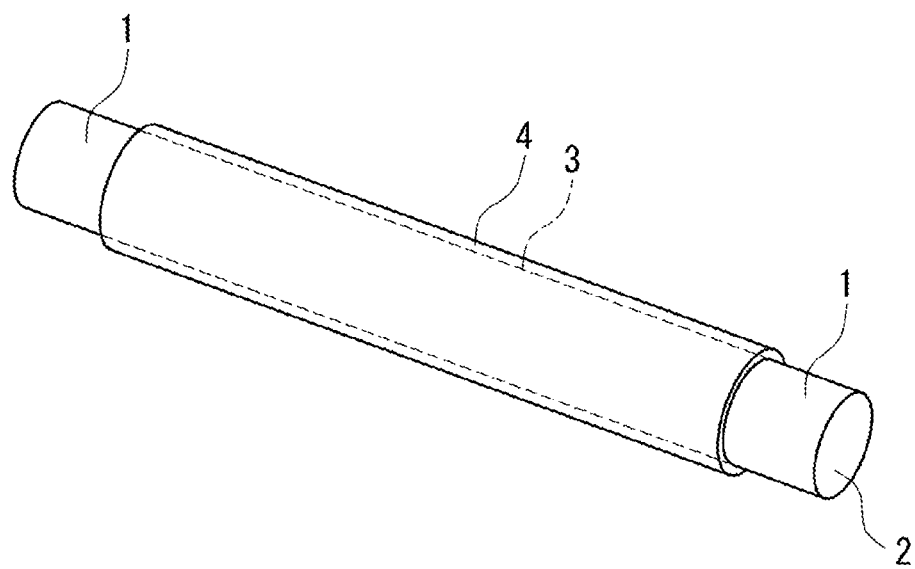
FIG. 2B is a schematic perspective view illustrating an exemplary arrangement of a wavelength conversion layer in an exemplary optical member of the first embodiment.

For example, the wavelength conversion layer 4 may be disposed in (i) a region from one end to the other end of the first light guide member 1 (FIG. 1), (ii) a region from one end to the vicinity of the other end of the first light guide member 1 (FIG. 2A), or (iii) a region (FIG. 2B) from the vicinity of one end to the vicinity of the other end of the first light guide member 1.

In the optical member 101 according to the first embodiment, the wavelength conversion layer 4 is disposed over the entire circumference of the lateral surface 3 of the first light guide member 1. In other words, the wavelength conversion layer 4 surrounds the first light guide member 1 at the location where the wavelength conversion layer 4 is disposed.

The wavelength conversion layer 4 may be formed as a layer having a phosphor itself disposed on the lateral surface 3 of the first light guide member 1, or a layer in which a phosphor is dispersed may be disposed on the lateral surface 3. In perspective of ease of formation of the layer, the wavelength conversion layer 4 is preferably, for example, a phosphor-dispersed resin layer.

The resin used in the wavelength conversion layer 4 may be selected, for example, from a silicone resin, a silicone-modified resin, an epoxy resin, a phenol resin, a polycarbonate resin, an acrylic resin, a methylpentene resin, or a polynorbornene resin.

The content of the phosphor in the phosphor-dispersed resin layer may be preferably 30 vol. % or greater, more preferably 50 vol. % or greater, further preferably 70 vol. % or greater, and even further preferably 80 vol. % or greater. By increasing the content of the phosphor, the wavelength of light emitted from the first light guide member 1 can more reliably be converted. Furthermore, the content of the phosphor in the phosphor-dispersed resin layer may be preferably 95 vol. % or less, more preferably 90 vol. % or less, such as 80 vol. % or less, 70 vol. % or less, or 60 vol. % or less. The reduced content of phosphor facilitates handling of the wavelength conversion layer 4 and disposing the first light guide member 1 on the lateral surface 3.

The content of the phosphor in the phosphor-dispersed layer may be, for example, 30 vol. % or greater and 95 vol. % or less, 50 vol. % or greater and 95 vol. % or less, 70 vol. % or greater and 95 vol. % or less, 50 vol. % or greater and 90 vol. % or less, 70 vol. % or greater and 90 vol. % or less, or 50 vol. % or greater and 80 vol. % or less.

Phosphor

Examples of the phosphor include yttrium aluminum garnet based phosphors (for example, $Y_3(Al,Ga)_5O_{12}:Ce$), lutetium aluminum garnet based phosphors (for example, $Lu_3(Al,Ga)_5O_{12}:Ce$), terbium aluminum garnet based phosphors (for example, $Tb_3(Al,Ga)_5O_{12}:Ce$), CCA based phosphors (for example, $Ca_{10}(PO_4)_6Cl_2:Eu$), SAE based phosphors (for example, $Sr_4Al_{14}O_{25}:Eu$), chlorosilicate based phosphors (for example, $Ca_8MgSi_4O_{16}Cl_2:Eu$), oxinitride based phosphors such as β-sialon based phosphors (for example, $(Si,Al)_3(O,N)_4:Eu$) or α-sialon based phosphors (for example, $Ca(Si,Al)_{12}(O,N)_{16}:Eu$), SLA based phosphors (for example, $SrLiAl_3N_4:Eu$), nitride based phosphors such as CASN based phosphors (for example, $CaAlSiN_3:Eu$) or SCASN based phosphors (for example, $(Sr,Ca)AlSiN_3:Eu$), fluoride based phosphors such as KSF based phosphors (for example, $K_2SiF_6:Mn$), KSAF based phosphors (phosphors including an alkali metal including K, and Si, Al, Mn, and F, for example, $K_2Si_{0.99}Al_{0.01}F_{5.99}:Mn$) or MGF based phosphors (for example, $3.5MgO\ 0.5MgF_2\ GeO_2:Mn$), phosphors having a perovskite structure (for example, $CsPb(F,Cl,Br,I)_3$) or quantum dot phosphors (for example, $CdSe$, $InP$, $AgInS_2$, or $AgInSe_2$), or the like. One type of phosphor or a plurality of types of phosphors may be used as the phosphor.

Such a phosphor is preferably a fluoride phosphor, more preferably a KSAF based phosphor.

The KSAF based phosphor includes an alkali metal including potassium (K), silicon (Si), aluminum (Al), manganese (Mn), and fluorine (F).

Preferably, the fluoride phosphor has a first composition including an alkali metal including K, and Si, Al, Mn, and F, and has a cubic system crystal structure having a lattice constant of 0.8138 nm or greater. In the first composition, when the total number of moles of the alkali metal is 2, the total number of moles of Si, Al, and Mn is 0.9 or greater and 1.1 or less, the number of moles of Al is greater than 0 and 0.1 or less, the number of moles of Mn is greater than 0 and 0.2 or less, and the number of moles of F is 5.9 or greater and 6.1 or less. Mn in the KSAF based phosphor may include tetravalent Mn ions. For example, the fluoride phosphor can be manufactured by a method for manufacturing a fluoride phosphor which will be described later.

The fluoride phosphor including Si and Al, having a composition with a specific content ratio of Al, and having the cubic system crystal structure having the lattice constant greater than or equal to a predetermined value can exhibit higher brightness. This can be thought, for example, as follows. That is, it can be thought that substituting a portion of Si constituting the crystal structure of the fluoride phosphor with Al would compensate for the deficiency of F in the crystal structure, thus stabilizing the crystal structure. Substituting a portion of Si in the crystal structure of the fluoride phosphor with Al also makes the lattice constant be equal to or greater than a predetermined value. Furthermore, the fluoride phosphor includes Al in the crystal structure, indicating a peak deriving from an Al—F bond in, for example, the infrared absorption spectrum.

In the first composition of the fluoride phosphor, the ratio of the total number of moles of Si, Al, and Mn to the total number of moles 2 of the alkali metal may be, for example, 0.9 or greater and 1.1 or less, and preferably 0.95 or greater and 1.05 or less, or 0.97 or greater and 1.03 or less. The ratio of the total number of moles of Al to the total number of moles 2 of the alkali metal may be, for example, greater than 0 and 0.1 or less, and preferably greater than 0 and 0.03 or less, or 0.002 or greater and 0.02 or less or 0.003 or greater and 0.015 or less. The ratio of the total number of moles of Mn to the total number of moles 2 of the alkali metal may be, for example, greater than 0 and 0.2 or less, and preferably 0.005 or greater and 0.15 or less, 0.01 or greater and 0.12 or less, or 0.015 or greater and 0.1 or less. The ratio of the number of moles of F to the total number of moles 2 of the alkali metal may be, for example, 5.9 or greater and 6.1 or less, preferably 5.92 or greater and 6.05 or less, or 5.95 or greater and 6.025 or less. In the first composition, the ratio of the number of moles of Si to the total number of moles 2 of the alkali metal may be, for example, 0.7 or greater and 1.1 or less, and preferably 0.8 or greater and 1.03 or less, 0.85 or greater and 1.01 or less, or 0.92 or greater and less than 0.95. In the first composition, the ratio of the number of moles of Al to the number of moles of Si may be, for example, 0.001 or greater and 0.14 or less, and preferably 0.002 or greater and 0.04 or less or 0.003 or greater and 0.015 or less.

The fluoride phosphor may have a composition represented by Formula (I) below as the first composition.

$$M_2[Si_pAl_qMn_rF_s] \qquad (I)$$

In Formula (I), M represents an alkali metal and may include at least K. Mn may be a tetravalent Mn ion. p, q, r, and s may satisfy $0.9 \leq p+q+r \leq 1.1$, $0 < q \leq 0.1$, $0 < r \leq 0.2$, $5.9 \leq s \leq 6.1$.

Preferably $0.95 \leq p+q+r \leq 1.05$ or $0.97 \leq p+q+r \leq 1.03$, $0 < q \leq 0.03$, $0.002 \leq q \leq 0.02$ or $0.003 \leq q \leq 0.015$, $0.005 \leq r \leq 0.15$, $0.01 \leq r \leq 0.12$ or $0.015 \leq r \leq 0.1$, $5.92 \leq s \leq 6.05$ or $5.95 \leq s \leq 6.025$.

The alkali metal in the composition of the fluoride phosphor described above and in the compositions of first fluoride particles and second fluoride particles which will be described later may include at least K, and may include one selected from the group consisting of lithium (Li), sodium (Na), rubidium (Rb), and cesium (Cs). A ratio of the number of moles of potassium (K) to the total number of moles of the alkali metal in the composition may be, for example, 0.90 or greater, and preferably 0.95 or greater, or 0.97 or greater. The upper limit of the ratio of the number of moles of K may be, for example, not greater than 1 or 0.995. In the first composition, some of the alkali metals may be substituted with ammonium ions ($NH^{4+}$). When some of the alkali metals are substituted with ammonium ions, the ratio of the number of moles of the ammonium ions to the total number of moles of the alkali metal in the composition may be, for example, 0.10 or less, and preferably 0.05 or less, or 0.03 or less. The lower limit of the ratio of the number of moles of ammonium ions may be, for example, greater than 0, and may be preferably 0.005 or greater.

The fluoride phosphor may include the cubic system crystal structure, or may include other crystal structures such as hexagonal crystal structure in addition to the cubic system crystal structure, or may substantially include only the cubic system crystal structure. As used herein, "substantially" means that the content ratio of the crystal structures other than the cubic system crystal structure is less than 0.5%.

When the fluoride phosphor includes the cubic system crystal structure, the lattice constant may be, for example, 0.8138 nm or greater, and preferably 0.8140 nm or greater or 0.8143 nm or greater. The upper limit of the lattice constant may be, for example, 0.8150 nm or less. The fluoride phosphor including the cubic system crystal structure and its lattice constant can be evaluated by measuring an X-ray diffraction pattern of the fluoride phosphor. The X-ray diffraction pattern is measured, for example, using CuKα radiation as the X-ray source ($\lambda$=0.15418 nm, tube voltage 40 kV, and tube current 40 mA).

The fluoride phosphor may have, in the infrared absorption spectrum, an absorption peak in a wavenumber of 590 $cm^{-1}$ or greater and 610 $cm^{-1}$ or less, and preferably 593 $cm^{-1}$ or greater and 607 $cm^{-1}$ or less or 595 $cm^{-1}$ or greater and 605 $cm^{-1}$ or less. It is thought that absorption peak in the predetermined wavenumber range is derived from the Al—F bond in, for example, a cubic system crystal structure. The infrared absorption spectrum is measured by, for example, the attenuated total reflection (ATR) method.

The fluoride phosphor may have irregularities, grooves, or the like on the surface of particles. It is thought that incorporating Al into the crystal structure of the fluoride phosphor causes change in the crystal structure of the fluoride phosphor, causing irregularities, grooves, or the like to be formed on the surface of particles. The state of the particle surface can be evaluated by, for example, measuring the angle of repose of the powder of fluoride phosphor. The angle of repose of the powder of fluoride phosphor may be, for example, 60 degrees or less, and preferably 55 degrees or less. The lower limit of the angle of repose is, for example, 30 degrees or greater, preferably 40 degrees or greater, and more preferably 50 degrees or greater. The use of the powder of fluoride phosphor having a large angle of repose allows for reducing aggregation of the powder and allow the powder to be more uniformly dispersed in the resin. Accordingly, the fluoride phosphor can be disposed more uniformly on the lateral surface 3 of the first light guide member 1, and the optical member 101 can emit light with reduced irradiation unevenness. The angle of repose of the powder can be measured, for example, using a powder property measuring instrument (for example, A. B. D. Powder Tester from Tsutsui Scientific Instruments Co., Ltd.).

Further, the state of the particle surface of the fluoride phosphor can be evaluated by, for example, measuring the degree of dispersion, bulk density, or the like of the powder made of fluoride phosphor. In the fluoride phosphor having a predetermined degree of dispersion or a predetermined bulk density, aggregation of the powder made of fluoride phosphor is reduced, thus facilitating handling of the powder and improving workability in the process of, for example, dispersing the powder in the resin. In addition, a packing density of the fluoride phosphor in the wavelength conversion layer can be increased. The degree of dispersion of the powder made of fluoride phosphor may be, for example, 2.0% or greater, and preferably 5.0% or greater, 15% or greater, or 20% or greater. The upper limit of the degree of dispersion may be, for example, 75% or less, 60% or less, or 50% or less. The degree of dispersion of the powder can be measured using, for example, the powder property measuring instrument (for example, A. B. D. Powder Tester from Tsutsui Scientific Instruments, Co., Ltd.). Specifically, the degree of dispersion is calculated in a percentage by dropping the sample from the hopper to the pan for the degree of dispersion and dividing the weight of the dropped sample minus the weight of the sample remaining in the receiving pan by the weight of the dropped sample.

The bulk density of the powder made of fluoride phosphor may be, for example, 1.00 g·cm$^{-3}$ or greater, and preferably 1.05 g·cm$^{-3}$ or greater, 1.10 g·cm$^{-3}$ or greater, or 1.15 g·cm$^{-3}$ or greater.

The upper limit of the bulk density may be, for example, 1.50 g·cm$^{-3}$ or less, 1.40 g·cm$^{-3}$ or less, or 1.30 g·cm$^{-3}$ or less. The bulk density is measured, for example, by a normal measurement method using a measuring cylinder. The bulk density is described specifically. Typically, the bulk density of the powder is determined by measuring the volume of a known weight of the powder sample contained in the measuring cylinder, or by measuring the weight of a known volume of the powder sample put into the container through the Scott Volumeter, or using a dedicated measuring container.

A method for using the measuring cylinder, for example, is described. First, a sufficient amount of sample is prepared for measurement and, if necessary, is passed through a sieve. Subsequently, a required amount of sample is put into a dry and constant volume measuring cylinder. The top surface of the sample is made uniform, if desired. These operations are done statically so as not to affect the physical properties of the sample. The volume is then read to the smallest scale unit, and the bulk density is determined by calculating the weight of the sample per unit volume. The bulk density is preferably measured repeatedly, and is more preferably measured as an arithmetic mean value of the measurement values.

In perspective of brightness improvement, a volume-based median diameter of the fluoride phosphor may be, for example, 10 μm or greater and 90 μm or less, and is preferably 15 μm or greater and 70 μm or less or 20 μm or greater and 50 μm or less. In perspective of brightness improvement, the particle size distribution of the fluoride phosphor may have a single peak, and preferably have a single peak with a narrow distribution range.

The fluoride phosphor is, for example, a phosphor activated by tetravalent Mn ions and is adapted to absorb a short wavelength range of visible light to emit red light. The excitation light may mainly be light in the blue region, and the peak wavelength of the excitation light may be, for example, 380 nm or greater and 485 nm or less. The emission peak wavelength in the emission spectrum of the fluoride phosphor may be, for example, 610 nm or greater and 650 nm or less. Because the light of the wavelength of 610 nm or greater and 650 nm or less is required for the growth phase of plants after germination, the light emission by the fluoride phosphor described above is advantageous for growing plants. The half bandwidth in the emission spectrum of the fluoride phosphor may be, for example, 10 nm or less which is preferable for efficient exposure to the light required for plants during the growth phase subsequent to germination.

Fluoride Phosphor Manufacturing Method

Figure 3:
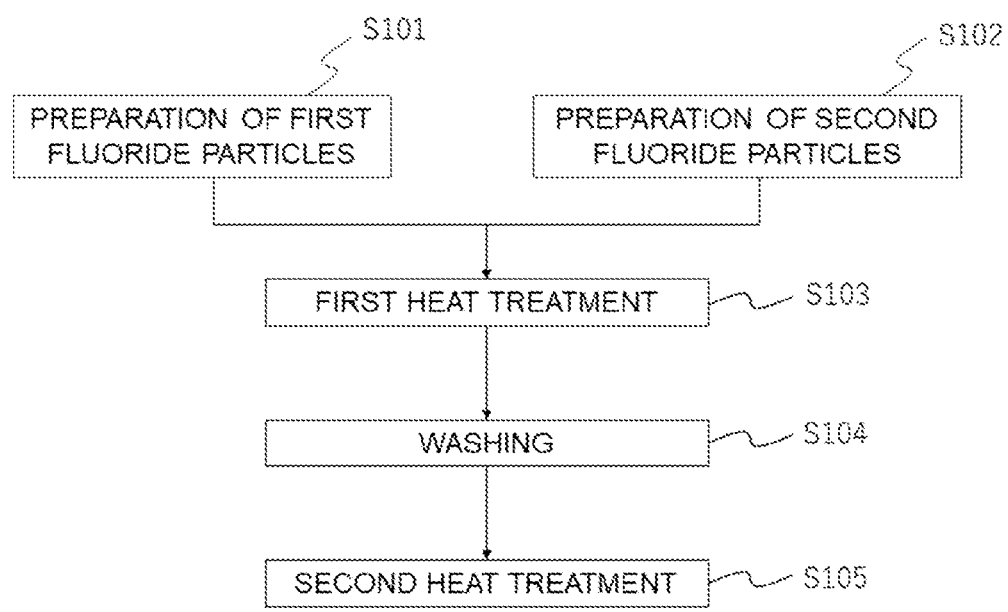
FIG. 3 is a flowchart illustrating an exemplary process flow of an exemplary method for manufacturing a fluoride phosphor.

FIG. 3 is a flowchart illustrating an example process of a method for manufacturing a fluoride phosphor. The method for manufacturing the fluoride phosphor may include preparing first fluoride particles (S101), preparing second fluoride particles (S102), and carrying out first heat treatment (S103). Either the preparing of the first fluoride particles (S101) or the preparing of the second fluoride particles (S102) may be done first or both may be done simultaneously. The method for manufacturing the fluoride phosphor may also include washing (S104) subsequent to the carrying out of the first heat treatment (S103), and may further include carrying out a second heat treatment (S105) subsequent to the washing (S104).

The method for manufacturing the fluoride phosphor includes a first preparation step of preparing first fluoride particles, a second preparation step of preparing second fluoride particles, and carrying out a first heat treatment in which a mixture of the first fluoride particles and the second fluoride particles is subjected to a first heat treatment in an inert gas atmosphere at a temperature range from 600° C. to 780° C. to obtain a first heat-treated material. The first fluoride particles have a second composition containing an alkali metal containing K, and Si, Mn and F. In the second composition, with respect to the total number of moles 2 of the alkali metal, the total number of moles of Si and Mn is 0.9 or greater and 1.1 or less, the number of moles of Mn is greater than 0 and 0.2 or less, and the number of moles of F is 5.9 or greater and 6.1 or less. The second fluoride particles have a third composition containing an alkali metal including K, and Al and F. In the third composition, with respect to the total number of mole 1 of Al, the total number of moles of the alkali metal is 2 or greater and 3 or less, and the number of moles of F is 5 or greater and 6 or less.

By the heat treatment of the mixture of the first fluoride particles including Mn as an activating element and the second fluoride particles including Al at a specific temperature, Al is introduced into the composition of the first fluoride particles, thus providing the fluoride phosphor having high brightness. This can be thought as follows, for example. That is, it is thought that the heat treatment of the mixture of the first and second fluoride particles at a relatively high temperature causes the second fluoride particles to be incorporated into the first fluoride particles and substitutes some Si in the crystal structure of the first fluoride particles with Al, thus compensating for the deficiency of F in the crystal structure of the fluoride phosphor, stabilizing the crystal structure, and improving brightness.

First Preparation Step In the first preparation step, the first fluoride particles having the second composition are prepared. In the second composition, with respect to the total number of moles 2 of the alkali metal, the ratio of the total number of moles of Si and Mn may be 0.9 or greater and 1.1 or less, the ratio of the number of moles of Mn may be greater than zero and 0.2 or less, and the ratio of the number of moles of F may be 5.9 or greater and 6.1 or less. The ratio of the total number of moles of Si and Mn may preferably be 0.95 or greater and 1.05 or less or 0.97 or greater and 1.03 or less. The ratio of the number of moles of Mn may preferably be 0.005 or greater and 0.15 or less, 0.01 or greater and 0.12 or less, or 0.015 or greater and 0.1 or less. The ratio of the number of moles of F may preferably be 5.95 or greater and 6.05 or less or 5.97 or greater and 6.03 or less.

The first fluoride particles may have the composition represented by Formula (III) below as the second composition.

$$M_2[Si_bMn_cF_d] \qquad (III)$$

In Formula (III), M represents an alkali metal and may include at least K. Mn may be a tetravalent Mn ion. b, c, and d may satisfy 0.9≤b+c≤1.1, 0<c≤0.2, 5.9<d≤6.1. Preferably, 0.95≤b+c≤1.05 or 0.97≤b+c≤1.03, 0.005<c≤0.15, 0.01≤c≤0.12, or 0.015≤c≤0.1, 5.95≤d≤6.05, or 5.97≤d≤6.03.

In perspective of brightness improvement, the volume-based median diameter of the first fluoride particles may be, for example, 10 μm or greater and 90 μm or less, and preferably 15 μm or greater and 70 μm or less or 20 μm or greater and 50 μm or less. From the perspective of improving brightness, the particle size distribution of the first fluoride particles may be a particle size distribution having a single peak. Preferably, the particle size distribution may have a single peak with a narrow distribution width. Specifically, in the volume-based particle size distribution, when the particle size corresponding to 10% cumulative volume from the smallest diameter side is D10, and the particle size corresponding to 90% cumulative volume from the smallest diameter side is D90, the ratio of D90 to D10 (D90/D10) may be 3.0 or less.

The first fluoride particles are made of, for example, the phosphor activated by tetravalent Mn ions, and may absorb the short wavelength range of visible light to emit red light. The excitation light may be primarily light in the blue region, and the peak wavelength of the excitation light may be within a wavelength range of, for example, from 380 nm to 485 nm. The emission peak wavelength in the emission spectrum of the first fluoride particles may be, for example, within a wavelength range from 610 nm to 650 nm. The half width of the emission spectrum of the first fluoride particles may be, for example, 10 nm or less.

The first fluoride particles may be prepared by purchasing or by manufacturing by a manufacturing method described below. The following describes the manufacturing method when the alkali metal is potassium, but the manufacturing method can be used similarly even when the alkali metal includes an alkali metal other than potassium.

The method for manufacturing the first fluoride particles includes mixing, for example, a first solution including at least potassium ions and hydrogen fluoride, a second solution including at least a first complex ions including tetravalent Mn ions and hydrogen fluoride, and a third solution including at least second complex ions including silicon and fluorine ions. By mixing the first, second, and third solutions, fluoride particles having the desired composition and functioning as the phosphor can be manufactured by a simple and highly productive method.

The first solution includes at least potassium ions and hydrogen fluoride, and may include other components, as necessary. The first solution is obtained, for example, as an aqueous solution of hydrofluoric acid in which a compound including potassium ions is dissolved. Examples of the compound including potassium ion constituting the first solution include water soluble compounds such as potassium ion-containing halides, hydrogen fluoride compound, hydroxides, acetates, carbonates, or the like. Specifically, a water soluble potassium salt such as KF, $KHF_2$, KOH, KCl, KBr, KI, $CH_3COOK$, $K_2CO_3$, or the like may be used.

In particular, $KHF_2$ is preferable because it can be dissolved without lowering the hydrogen fluoride concentration in the solution, and has low heat of dissolution and high safety. One type of compound containing potassium ions constituting the first solution may be used alone, or two or more types of compounds may be used in combination.

The lower limit of the hydrogen fluoride concentration in the first solution is typically 1 mass % or greater, preferably 3 mass % or greater, and more preferably 5 mass % or greater. The upper limit of the hydrogen fluoride concentration in the first solution is typically 80 mass % or less, preferably 75 mass % or less, and more preferably 70 mass % or less. The lower limit of the potassium ion concentration in the first solution is typically 1 mass % or greater, preferably 3 mass % or greater, and more preferably 5 mass % or greater. The upper limit of potassium ion concentration in the first solution is typically 30 mass % or less, preferably 25 mass % or less, and more preferably 20 mass % or less. With the potassium ion concentration of 5 mass % or greater, the yield of the first fluoride particle tends to be improved.

The second solution includes at least the first complex ions including tetravalent Mn ions and hydrogen fluoride, and may optionally include other components, as necessary. For example, the second solution is acquired as an aqueous solution of hydrofluoric acid containing a tetravalent manganese source. The manganese source is a compound containing the tetravalent Mn ion. Specifically, $K_2MnF_6$, $KMnO_4$, $K_2MnCL_6$, or the like can be used as the manganese source constituting the second solution. Among these, $K_2MnF_6$ is preferred because it does not contain chlorine, which tends to distort and destabilize the crystal lattice, and because it can exist stably in hydrofluoric acid as $MnF_6$ complex ion while maintaining an oxidation number (tetravalent) that can be activated. The manganese source including potassium ions can also function as a source of potassium ions contained in the first solution. One manganese source constituting the second solution may be used alone or two or more manganese sources may be used in combination.

The lower limit of the hydrogen fluoride concentration in the second solution is typically 1 mass % or greater, preferably 3 mass % or greater, and more preferably 5 mass % or greater. The upper limit of the hydrogen fluoride concentration in the second solution is typically 80 mass % or less, preferably 75 mass % or less, and more preferably 70 mass % or less. The lower limit of the first complex ion concentration in the second solution is typically 0.01 mass % or greater, preferably 0.03 mass % or greater, and more preferably 0.05 mass % or greater. The upper limit of the first complex ion concentration in the second solution is typically 5 mass % or less, preferably 3 mass % or less, and more preferably 2 mass % or less.

The third solution includes at least the second complex ions including silicon and fluorine ions, and may include other components, as necessary. The third solution is obtained, for example, as an aqueous solution including a second complex ion source. Preferably, the second complex ion source is a compound that includes silicon and fluoride ions, and is excellent in solubility in the solution. Specifically, the second complex ion source may be, for example, $H_2SiF_6$, $Na_2SiF_6$, $(NH_4)_2SiF_6$, $Rb_2SiF_6$, $Cs_2SiF_6$, or the like. Among these, $H_2SiF_6$ is preferred due to its high solubility in water and the absence of alkali metal elements as impurities. One second complex ion source constituting the third solution may be used alone or two or more second complex ion sources may be used in combination.

The lower limit of the second complex ion concentration in the third solution is typically 10 mass % or greater, preferably 15 mass % or greater, and more preferably 20 mass % or greater. The upper limit of the second complex ion concentration in the third solution is typically 60 mass % or less, preferably 55 mass % or less, and more preferably 50 mass % or less.

To mix the first, second, and third solutions, for example, the second and third solutions may be added and mixed while stirring the first solution, or the first and second solutions may be added and mixed while stirring the third solution. Alternatively, the first, second, and third solutions may be put into a container, respectively, and stirred and mixed.

By mixing the first, second, and third solutions, the first complex ion, the potassium ion, and the second complex ion react to precipitate desired first fluoride particle crystals. The precipitated crystals can be collected by solid-liquid separation by filtration or the like. Alternatively, a reducing agent such as hydrogen peroxide water may be added, or a solvent such as ethanol, isopropyl alcohol, water, acetone, or the like may be used for washing. Drying treatment may further be carried out. The drying treatment may be carried out typically at 50° C. or higher, preferably 55° C. or higher, more preferably 60° C. or higher, and usually 110° C. or lower, preferably 105° C. or lower, more preferably 100° C. or lower. As for the drying time, there is no particular limit, but it is necessary to remove water adhering to the first fluoride particles in, for example, about 10 hours.

When mixing the first, second, and third solutions, it is preferable to adjust the mixing ratio of the first, second, and third solutions appropriately so that the composition of the first fluoride particles as a product becomes the desired composition, taking into consideration the deviation between the prepared composition of the phosphor raw material and the composition of the first fluoride particles obtained.

The method for manufacturing the first fluoride particles may include a granulating step in which crushing, grinding, classification operations or the like are carried out in combination subsequent to the drying treatment. By the granulating step, powder having a desired particle size can be obtained.

Second Preparation Step

In the second preparation step, second fluoride particles having a third composition are prepared. In the third composition, with respect to mole of Al, the ratio of the total number of moles of the alkali metal may be 1 or greater and 3 or less, and the ratio of the number of moles of F may be 4 or greater and 6 or less. Alternatively, in one aspect, in the third composition, with respect to mole of Al, the ratio of the total number of moles of the alkali metal may be 2 or greater and 3 or less, and the ratio of the number of moles of F may be 5 or greater and 6 or less.

The second fluoride particles may have a composition represented by Formula (IV) below as the third composition.

$$Me[AlF_f] \tag{IV}$$

In Formula (IV), M represents an alkali metal and may include at least K. e and f may satisfy $2 \le e \le 3$, $5 \le f \le 6$.

The second fluoride particles may have a composition represented by Formula (IVa) or (IVb), or may include both compositions.

$$M_3[AlF_6] \tag{IVa}$$

$$M_2[AlF_5] \tag{IVb}$$

In perspective of reactivity with the first fluoride particles, the specific surface area of the second fluoride particles is, for example, 0.3 m².g⁻¹ or greater, and preferably 1 m².g⁻¹ or greater, or 3 m².g⁻¹ or greater. The upper limit of the specific surface area of the second fluoride particles may be, for example, 30 m².g⁻¹ or less. The specific surface area is measured, for example, by the BET method.

The second fluoride particles may be prepared by purchasing or by manufacturing by a known manufacturing method.

First Heat Treatment Step

A first heat treatment step may include mixing the prepared first fluoride particles and second fluoride particles to obtain a mixture, and carrying out a first heat treatment of the obtained mixture in an inert gas atmosphere at a temperature range from 600° C. to 780° C. to obtain a first heat-treated material. The first heat-treated material includes a target fluoride phosphor.

The first and second fluoride particles can be mixed, for example, by dry mixing as is usually done. The dry mixing can be carried out using, for example, a high speed fluid mixer or the like. As the content of the number of moles of the first and second fluoride particles in the mixture, the ratio of the second fluoride particles to the total number of moles of the first and second fluoride particles may be, for example, greater than 0 and less than 0.1. It is preferably less than 0.05 moles or less than 0.03 moles. The lower limit of the ratio of the number of moles of the second fluoride particles may preferably be 0.003 or greater or 0.005 or greater.

The heat treatment temperature (also referred to as the first heat treatment temperature) in the first heat treatment step may be, for example, 600° C. or higher. Preferably, the heat treatment temperature may be 625° C. or greater, 650° C. or greater, or 675° C. or greater. With the heat treatment temperature is 600° C. or greater, the first fluoride particles can efficiently incorporate the second fluoride particles, allowing some of Si in the crystal structure of the first fluoride particles to be substituted with Al to obtain a fluoride phosphor having high brightness. The heat treatment temperature in the first heat treatment step may be, for example, less than 800° C. Preferably, the heat treatment temperature may be 780° C. or less, 770° C. or less, 760° C. or less, or 750° C. or less. With the heat treatment temperature is less than 800° C., the thermal decomposition of the fluoride particles can be effectively suppressed. In one aspect, the first heat treatment temperature in the first heat treatment may be 650° C. or greater and 750° C. or less.

The heat treatment time in the first heat treatment step may be, for example, 1 hour or more and 40 hours or less, preferably 2 hours or more and 30 hours or less. With the heat treatment time in the above range, the substitution of Si with Al in the crystal structure of the first fluoride particles tends to proceed more efficiently, resulting in the fluoride phosphor having higher brightness. As used herein, the heat treatment time in the first heat treatment step means the time to hold the mixture of first and second fluoride particles at the first heat treatment temperature. In the first heat treatment step, a temperature increase rate up to the first heat treatment temperature may be, for example, 1° C./min or greater.

In the first heat treatment step, the heat treatment of the mixture in the inert gas atmosphere may be carried out. The inert gas atmosphere means the atmosphere including, as a main component, an inert gas such as a noble gas, for example, argon, helium, or the like, or nitrogen or the like. The main component in the inert gas atmosphere may be at least one type of element selected from argon, helium, nitrogen, or the like, and may include at least nitrogen. The concentration of the inert gas, for example, the nitrogen gas, in the inert gas atmosphere is, 70 vol. % or higher, preferably 80 vol. % or higher, 85 vol. % or higher, 90 vol. % or higher, or 95 vol. % or higher. The inert gas may include an active gas such as oxygen as an unavoidable impurity. The concentration of the active gas contained in the atmosphere in the first heat treatment step needs to be 15 vol. % or less, preferably 5 vol. % or less, 1 vol. % or less, 0.3 vol. % or less, 0.1 vol. % or less. The inert gas atmosphere may be free of active gas such as oxygen. With the concentration of the active gas in the inert gas atmosphere in the above range, the oxidation of tetravalent Mn in the mixture can be sufficiently suppressed.

The pressure during heat treatment in the first heat treatment step may be, for example, atmospheric pressure (0.101 MPa). The pressure during heat treatment may exceed 0.101 MPa and 1 MPa or less, or may be reduced below atmospheric pressure (0.101 MPa).

Washing Step

The method for manufacturing the fluoride phosphor may further include a washing step in which the first heat-treated material obtained in the first heat treatment step is brought into contact with a liquid medium. The washing step may include, for example, bringing the first heat-treated material into contact with the liquid medium and carrying out solid-liquid separation of the first heat-treated material that has been brought into contact with the liquid medium, and may further include drying the first heat-treated material subsequent to the solid-liquid separation, as necessary.

For example, by bringing the first heat-treated material into contact with the liquid medium, at least some impurities (for example, an alkali metal fluoride such as potassium fluoride) produced in the first heat treatment step can be removed. This can suppress the change in composition of the fluoride phosphor obtained and may effectively suppress the decrease in brightness due to the change in composition.

Examples of the liquid medium to be brought into contact with the first heat-treated material include lower alcohols such as ethanol, isopropyl alcohol, or the like, ketone solvents such as acetone or the like, or water. In perspective of removing impurities, the liquid medium may at least contain water, and water may be deionized water, distilled water, or purified water purified through a microfiltration membrane, an ultrafiltration membrane, a reverse osmosis membrane, or the like.

The liquid medium may include a reducing agent such as hydrogen peroxide. With the liquid medium including the reducing agent, even when the tetravalent Mn ion that functions as the activator in the fluoride phosphor is oxidized by the first heat treatment, the tetravalent Mn ion can be reduced by the reducing agent in the washing solution and the emission characteristic of the resulting fluoride phosphor can be increased. The reducing agent included in the liquid medium may have the content ratio of, for example, 0.01 mass % or greater and 5 mass % or less, and preferably 0.05 mass % or greater and 1 mass % or less. The amount of the liquid medium used for contacting the first heat-treated material may be, for example, 2 times or greater and 20 times or less the total mass of the first heat-treated material.

The first heat-treated material may be brought into contact with the liquid medium by mixing the first heat-treated material and the liquid medium and removing the liquid medium, or by causing the liquid medium to pass through the first heat-treated material held in a funnel or the like. The contact time of the first heat-treated material and the liquid medium may be, for example, 1 hour or more and 20 hours or less. The contact temperature of the first heat-treated material and the liquid medium may be, for example, 10° C. or greater and 50° C. or less.

The first heat-treated material that is in contact with the liquid medium may be subjected to the drying treatment. A drying temperature during the drying may be, for example, 50° C. or greater, preferably 55° C. or greater, or 60° C. or greater, and may also be, for example, 110° C. or less, and preferably 105° C. or less, or 100° C. or less. Drying time is the time during which at least part of the liquid medium (for example, moisture) adhering to the first heat-treated material can evaporate by being in contact with the liquid medium, and is, for example, about 10 hours.

Second Heat Treatment Step

The method for manufacturing the fluoride phosphor may further include a second heat treatment step in which, subsequent to the contact with the liquid medium, the first heat-treated material is subjected to a second heat treatment at a second heat treatment temperature of 400° C. or higher, while being in contact with the fluorine-containing substance, to obtain a second heat-treated material. The second heat-treated material includes a target fluoride phosphor.

It is thought that the heat treatment of the first heat-treated material subsequent to the contact with the liquid medium while being in contact with the fluorine-containing compound can supply fluorine atoms to the regions of the fluoride phosphor crystal structure where fluorine atoms are lacking, thus further reducing the defect in the crystal structure. It is also thought that the brightness is further improved as a result. It is also thought that the durability of the fluoride phosphor is further improved.

The fluorine-containing substance used in the second heat treatment step may be in a solid state, a liquid state, or a gaseous state, at room temperature. An example of a fluorine-containing substance that is in a solid or liquid state is $NH_4F$. Also, examples of fluorine-containing substances that are in a gaseous state include $F_2$, $CHF_3$, $CF_4$, $NH_4HF_2$, HF, $SiF_4$, $KrF_4$, $XeF_2$, $XeF_4$, and $NF_3$. The fluorine-containing substance that is in a gaseous state may be at least one selected from the group consisting of these, and is preferably at least one selected from the group consisting of $F_2$ and HF.

The fluorine-containing substance which is in the solid or liquid state at room temperature can be mixed with the first heat-treated material subsequent to the contact with the liquid medium and the fluorine-containing substance, thus bringing them into contact. For example, the first heat-treated material may be mixed with 1 mass % or greater and 20 mass % or less, preferably 21 mass % or greater and 20 mass % or less 10 mass % or less, of the fluorine-containing substance in terms of mass conversion of fluorine atoms, with respect to the total amount of the first heat-treated material and the fluorine-containing substance being 100 mass %.

The first heat-treated material and fluorine-containing substance may be mixed at a temperature of, for example, room temperature (20° C.±5° C.) or higher and lower than the second heat treatment temperature, or at the second heat treatment temperature. Specifically, the mixing may be performed at a temperature of 20° C. or greater and less than 400° C., or may be a temperature of 400° C. or greater. In a case in which the first heat-treated material and the fluorine-containing substance in the solid or liquid state at room temperature are brought into contact with each other at a temperature of 20° C. or greater and less than 400° C., the second heat treatment is carried out at a temperature of 400° C. or greater after bringing the first heat-treated material and the fluorine-containing substance into contact.

When the fluorine-containing substance is a gas, the first heat-treated material may be brought into contact with the fluorine-containing substance while being placed in an atmosphere containing the fluorine-containing substance. The atmosphere containing the fluorine-containing substance may include an inert gas such as noble gas or nitrogen in addition to the fluorine-containing substance. In this case, the concentration of the fluorine-containing substance in the atmosphere may be, for example, 3 vol. % or greater and 35 vol. % or less, preferably 5 vol. % or greater or 10 vol. % or greater, and preferably 30 vol. % or less or 25 vol. % or less.

The second heat treatment may be carried out by maintaining a second heat treatment temperature over a predetermined period of time while the first heat-treated material and the fluorine-containing substance are in contact. The second heat treatment temperature may be, for example, 400° C. or higher, preferably exceeding 400° C. such as 425° C. or higher, 450° C. or higher, or 480° C. or higher. The upper limit of the second heat treatment temperature may be, for example, less than 600° C., preferably lower than 580° C. such as 550° C. or lower or 520° C. or lower. The second heat treatment temperature may be a temperature lower than the first heat treatment temperature.

The second heat treatment temperature equal to or higher than the lower limit described above allows the fluorine atoms to be sufficiently supplied to the first heat-treated material, so that the brightness of the obtained fluoride phosphor tends to be further improved. The second heat treatment temperature lower than or equal to the upper limit described above allows the decomposition of the obtained fluoride phosphor to be more effectively suppressed, so that the brightness of the resulting fluoride phosphor tends to be further improved.

The heat treatment time in the second heat treatment, that is, the time for holding the second heat treatment temperature, may be, for example, 1 hour or more and 40 hours, preferably 2 hours or more or 3 hours or more, and preferably 30 hours or less, 10 hours or less, or 8 hours or less. The heat treatment time at the second heat treatment temperature within the above range allows the fluorine atoms to be sufficiently supplied to the first heat-treated material subsequent to the contact with the liquid medium. This tends to make the crystal structure of the fluoride phosphor more stable and manufacture the fluoride phosphor having higher brightness.

The heat treatment time at the second heat treatment temperature may be the same as the heat treatment time at the first heat treatment temperature, or may be longer than the heat treatment time at the first heat treatment temperature. That is, the heat treatment time at the second heat treatment temperature may be one time or longer of the heat treatment time at the first heat treatment temperature. This tends to provide enough fluorine atoms to the first heat-treated material subsequent to the contact with the liquid medium, and further improves the brightness of the resulting fluoride phosphor.

The pressure in the second heat treatment step may be atmospheric pressure (0.101 MPa), exceeding the atmospheric pressure and at or lower than 5 MPa, or exceeding the atmospheric pressure and at or lower than 1 MPa.

The method for manufacturing the fluoride phosphor may include a granulating step in which a combination of crushing, grinding, classification operations, and the like are carried out on the resulting second heat-treated material subsequent to the second heat treatment process. The granulating step can provide powder having a desired particle size.

FIRST MODIFIED EXAMPLE

In an optical member 102 of a first modified example, the wavelength conversion layer 4 is disposed at a portion of the lateral surface 3 of the first light guide member 1 that is visible from at least one direction.

Figure 4A:
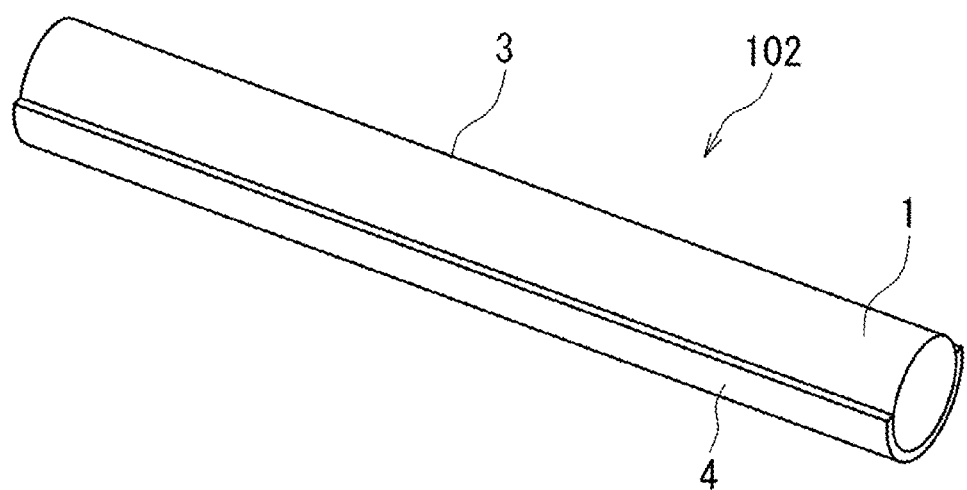
FIG. 4A is a schematic perspective view of an optical member according to a first modified example of the first embodiment.
Figure 4B:
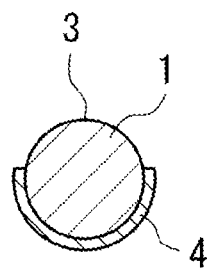
FIG. 4B is a schematic cross-sectional view of the optical member according to the first modified example of the first embodiment.

For example, FIGS. 4A and 4B illustrate the optical member 102 of the first modified example when viewed from below. As illustrated in the drawings, the wavelength conversion layer 4 is disposed in a region visible from below, that is, the lower half region of the lateral surface 3 of the first light guide member 1. The first modified example does not preclude the placement of the wavelength conversion layer 4 in the regions that are not visible. That is, in the optical member 102 illustrated in FIGS. 4A and 4B, the wavelength conversion layer 4 may be provided farther above. In other words, the wavelength conversion layer 4 may be provided in the region larger than the half of the lateral surface 3 in the cross-section of the first light guide member 1.

By disposing the wavelength conversion layer 4 on the portion of the lateral surface 3 of the first light guide member 1 that is visible from one direction, an irradiation target can be efficiently irradiated with light having a desired wavelength range.

Figure 4C:
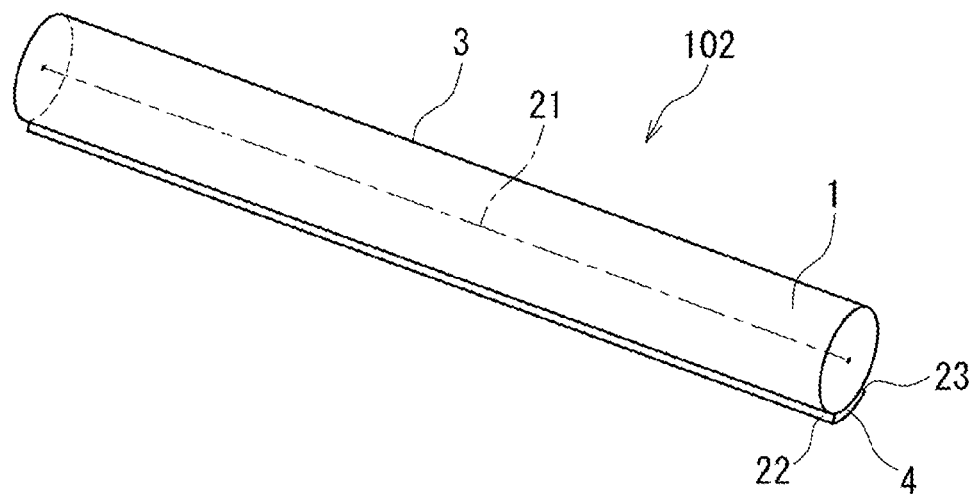
FIG. 4C is a schematic perspective view of the optical member according to one aspect of the first modified example of the first embodiment.
Figure 4D:
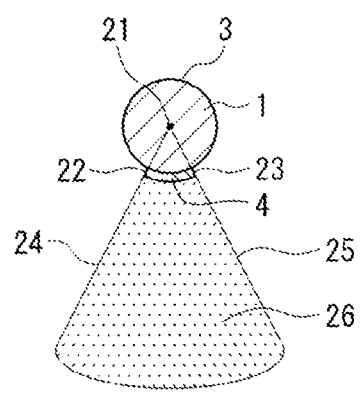
FIG. 4D is a schematic cross-sectional view illustrating an irradiation area of the optical member according to the one aspect of the first modified example of the first embodiment.

In FIGS. 4A and 4B, the wavelength conversion layer 4 is disposed in the region of the lower half of the lateral surface 3 of the first light guide member 1, but the first modified example is not limited thereto. For example, the wavelength conversion layer 4 can be disposed in a range narrower than the lower half, more specifically, 1/n (n is the number greater than 2) of the outer circumference, as in the optical member 102 illustrated in FIGS. 4C and 4D. According to such a structure, a region 26 can be selectively irradiated. This region 26 is located between the first irradiation side 24, which includes the centerline 21 of the first light guide member 1 (that is, the axis of the first light guide member 1) and one end edge 22 along the longitudinal direction of the wavelength conversion layer 4, and the second irradiation side 25, which includes the centerline 21 of the first light guide member 1 and one end edge 23 along the longitudinal direction of the wavelength conversion layer 4. In other words, an elongated region having a desired width can be irradiated with light having a desired wavelength region along the longitudinal direction. For example, the parts of the ridges where plants are grown can efficiently be irradiated.

The lateral surface 3 of the first light guide member 1 where no wavelength conversion layer 4 is disposed may be exposed, or may be covered by other members, for example, a light reflective member.

By placing the light reflective member on the lateral surface 3 of the first light guide member 1 where no wavelength conversion layer 4 is disposed, the light emitted from the optical member can be focused on the desired direction to increase the intensity of the emitted light.

The light reflective member can be, for example, a member having a light diffusion material contained in the resin, or a metal layer.

In the members having the light diffusion material contained in the resin, a silicone resin, an epoxy resin, an acrylic resin, or the like, for example, is used as the resin, and titanium dioxide, silicon oxide, aluminum oxide, zinc oxide, or the like, for example, is used as the light diffusion material.

In the metal layer, for example, platinum, silver, rhodium, aluminum, or the like is used as the metal.

SECOND MODIFIED EXAMPLE

In the optical member of second modified example, the first light guide member 1 includes a light diffusion material. The first light guide member 1 including the light diffusion material allows the light incident on the end surface 2 to exit easily from the lateral surface 3 of the first light guide member 1.

Preferably, the content of the light diffusion material in the first light guide member 1 increases as a distance from the end surface 2 on which the light is incident increases. In other words, the content of the light diffusion material in the first light guide member 1 increases as a distance from the light source increases. The larger the content of the light diffusion material in the first light guide member 1, the more easily the light incident on the end surface 2 is emitted to the outside of the first light guide member 1. The light incident on the end surface 2 attenuates as the light travels away from the end surface 2. However, by increasing the content of the light diffusion material in the first light guide member 1 as the distance from the end surface 2 increases, the proportion of light emitted from the lateral surface 3 at positions away from the end surface 2 increases, and the difference in intensity of light emitted from the first light guide member 1 in the longitudinal direction can be reduced.

The light diffusion material includes, for example, zirconia, titania, or the like.

In a case in which the light incident on the first light guide member 1 is ultraviolet light, the light diffusion material may preferably be zirconia as it has less light absorption characteristic in the ultraviolet wavelength range. The zirconia used in the above light diffusion material may be zirconia alone or the surface of zirconia may be coated with a coating film consisting of one or two or more silica, alumina, zinc, organic materials, or the like. Furthermore, zirconia used in the above light diffusion material may be stabilized zirconia or partially stabilized zirconia in which calcium, magnesium, yttrium, aluminum, or the like is added.

The titania used in the light diffusion material may be titania alone, or the surface of titania may be coated with a coating film consisting of one or two or more of silica, alumina, zirconia, zinc, organic materials, or the like.

Composite Optical Member

The composite optical member according to the present disclosure includes the optical member according to the above disclosure, and a second optical member that emits light having a wavelength different from the wavelength of the optical member, in which the second optical member is a second light guide member having an elongated shape and including a second light guide member having an end surface and a lateral surface extending in a longitudinal direction from the end surface.

The composite optical member according to the present disclosure includes two types of optical members, that is, an optical member and a second optical member that emits light having a wavelength different from the wavelength of the optical member, so that a single composite optical member can emit two types of light having different wavelengths.

Second Embodiment

Figure 5:
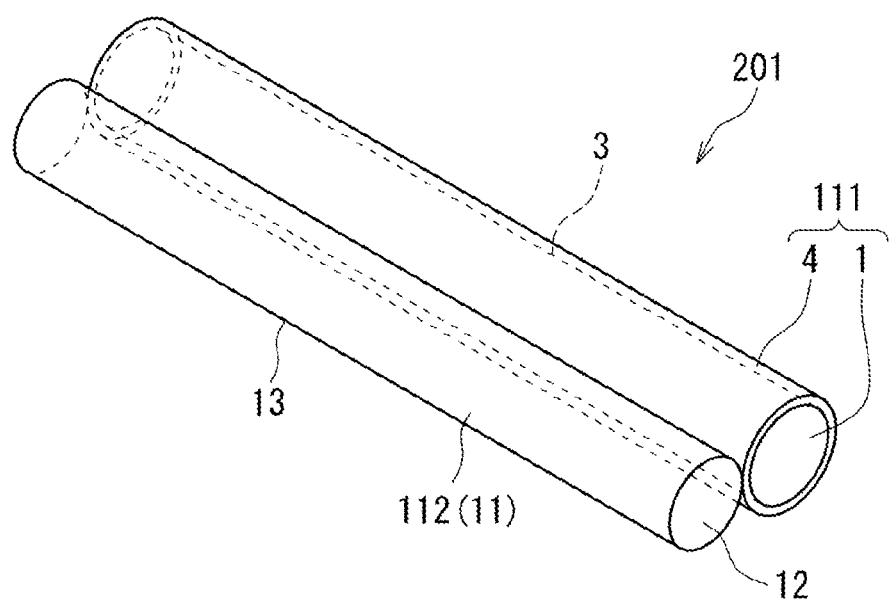
FIG. 5 is a schematic perspective view of an exemplary composite optical member according to a second embodiment.

A second embodiment according to the present disclosure relates to a composite optical member 201. A composite optical member 201 according to the second embodiment is described with reference to FIG. 5. FIG. 5 is a schematic perspective view of the composite optical member 201.

As illustrated in FIG. 5, the composite optical member 201 according to the second embodiment of the present disclosure includes an optical member 111 according to the present disclosure, and a second optical member 112 that emits light having a wavelength different from the wavelength of the optical member 111, in which the second optical member 112 is a second light guide member 11 having an elongated shape and including an end surface 12 and a lateral surface 13 extending in a longitudinal direction from the end surface 12.

The optical member 111 may be, for example, the optical member 101 or the optical member 102 described above.

The second light guide member 11 has the elongated shape and includes the end surface 12 and the lateral surface 13 extending in a longitudinal direction from the end surface 12. The second light guide member 11 may have characteristics similar to those described about the first light guide member 1.

The second light guide member 11 may be identical to the first light guide member 1 in the shape and composition, or may be different. Preferably, the second light guide member 11 and the first light guide member 1 have the same shape and composition. For example, the second light guide member 11 is cylindrical. The second light guide member 11 is made of the same resin material as the resin material of the first light guide member 1.

The second light guide member 11 may or may not have a wavelength conversion layer on the lateral surface 13, and preferably the second light guide member 11 has no wavelength conversion layer on the lateral surface 13. The second optical member 112 having no wavelength conversion layer on the lateral surface 13 of the second light guide member 11 can have the same wavelength characteristics for the light incident on the end surface 12 and the light emitted from the lateral surface 13.

The first light guide member 1 and the second light guide member 11 can be arranged so that their longitudinal directions are parallel to each other. The term "parallel" encompass not only a strictly parallel configuration, but also a slight deviation of, for example, approximately 10 degrees.

The optical member 111 and the second optical member 112 are disposed in close proximity to each other. For example, the optical member 111 and the second optical member 112 may be disposed so that their lateral surfaces are in contact with each other, or may be disposed in close proximity to each other. Preferably, the optical member 111 and the second optical member 112 are disposed so that their lateral surfaces are in contact with each other. By disposing the optical member 111 and the second optical member 112 in close proximity to each other and preferably in contact with each other, light having two different wavelength characteristics can be emitted to the irradiation target using one composite optical member.

In the composite optical member 201 according to the second embodiment, the optical member according to the first modified example of the first embodiment may be used as the optical member 111 and the second optical member 112. In this way, an area or a predetermined range under the optical member 111 and the second optical member 112 can be irradiated. In a case of using the second optical member 112 having no wavelength conversion layer, the second optical member 112 may include, for example, a light reflective layer on the lateral surface 13 except for the region corresponding to the region of the optical member 111 where the wavelength conversion layer 4 is provided.

Lighting Device

A lighting device according to the present disclosure includes the optical member or the composite optical member according to the present disclosure, and a light source facing the end surface of the optical member or the composite optical member.

The lighting device according to the present disclosure uses the optical member or the composite optical member according to the present disclosure, thus irradiating a wide area with light with reduction in irradiation unevenness. When the composite optical member according to the present disclosure is used, one lighting device can emit two types of light having different wavelengths.

The lighting device according to the present disclosure can preferably include the composite optical member in which the first light guide member and the second light guide member are arranged in parallel, and further include a switching device configured to switch an incident destination of light emitted from the light source to either the first light guide member or the second light guide member of the composite optical member.

In the lighting device described above, the light emitted by the light source enters the first optical member or the second optical member from the end surface of the first light guide member or the second light guide member, and exits from the lateral surface of the first optical member or the second optical member. The switching device can switch the incident destination of light emitted from the light source to either the first light guide member or the second light guide member of the composite optical member, so that the lighting device can selectively emit two types of light.

Third Embodiment

Figure 6A:
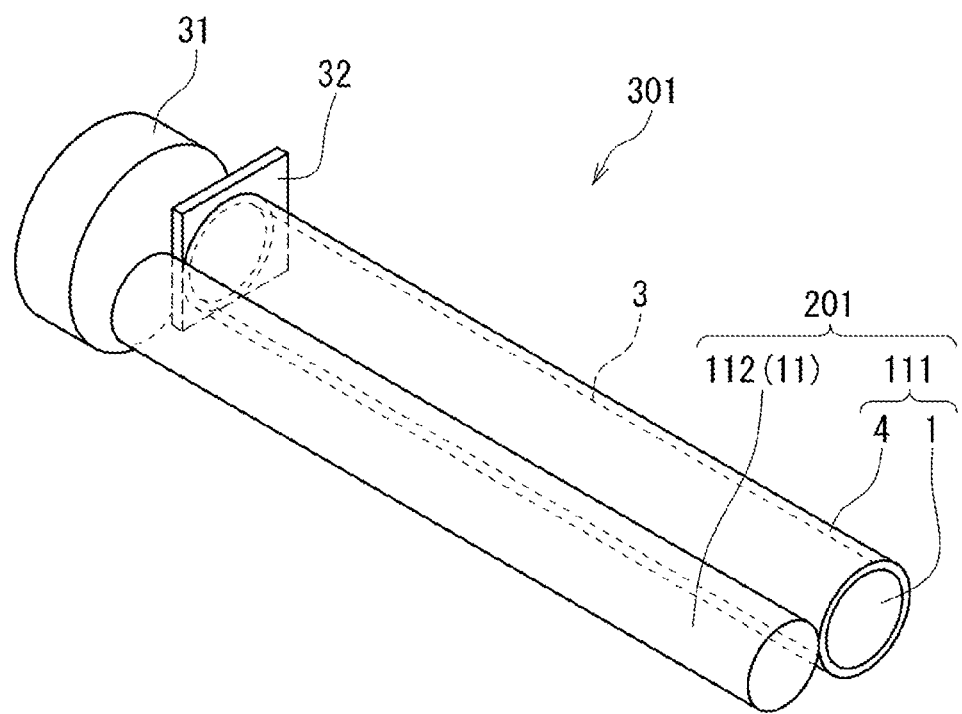
FIG. 6A is a schematic perspective view of an exemplary lighting device according to a third embodiment.

A third embodiment according to the present disclosure relates to a lighting device 301. The lighting device 301 according to the third embodiment is described with reference to FIGS. 6A and 6B. FIG. 6A is a schematic perspective view of the lighting device 301, and FIG. 6B is a schematic plan view of the lighting device 301.

Figure 6B:
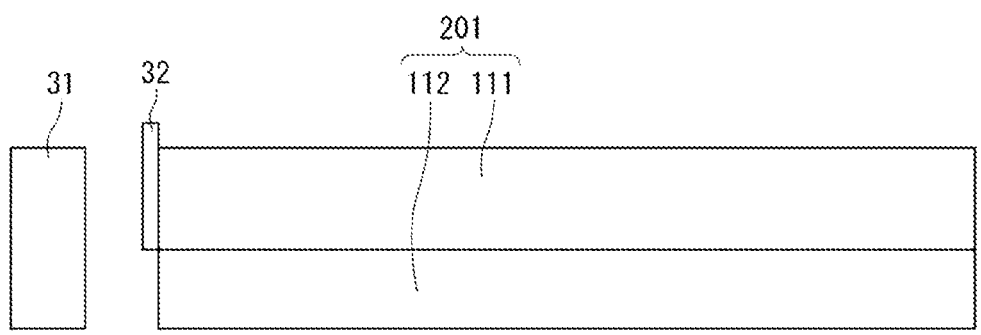
FIG. 6B is a schematic plan view of the exemplary lighting device according to the third embodiment.

As illustrated in FIGS. 6A and 6B, the lighting device 301 according to the third embodiment of the present disclosure includes the composite optical member 201 and a light source 31 facing the end surface of the composite optical member 201. A light shielding plate 32 that can switch the incident destination of light emitted from the light source 31 to either the first light guide member 1 or the second light guide member 11 of the composite optical member 201 can also be provided.

Light Source

The light source 31 faces the end surface of the composite optical member 201. The light emitted from the light source 31 is incident on either the first light guide member 1 or the second light guide member 11 of the composite optical member 201.

Preferably, one light source 31 is provided for one end surface of the composite optical member 201. In the lighting device 301 according to the present disclosure, even when a single light source 31 is provided for a single end surface of the composite optical member 201, with the light shielding plate 32 serving as a switching device, a member on which light is to be incident can be selected from the first light guide member 1 or the second light guide member 11, so that light can be selectively propagated to either the first light guide member 1 or the second light guide member 11.

According to an exemplary embodiment, an end surface of the optical member 111 and an end surface of the second optical member 112 that are located at the same side may be collectively indicated as a single "end surface of the composite optical member 201", and thus the composite optical member 201 may have a total of two end surfaces. In the illustrated example, the light source 31 is disposed only on one end surface side of the composite optical member 201, but is not limited thereto and may be disposed on sides of both end surfaces of the composite optical member 201. For example, a total of two light sources 31 may be disposed, one for each end surface of the composite optical member 201. With the light source 31 disposed on sides of both end surfaces of the composite optical member 201, the intensity of light emitted from the lighting device 301 can be increased, and more uniform illumination can be achieved.

The light source 31 is preferably a light emitting diode (LED) or a laser diode (LD). The use of the LED or LD can easily achieve irradiation of light in a useful wavelength range while avoiding irradiation of light in a less useful wavelength range. The use of the LED or LD is also preferred from the perspective of energy efficiency and economy due to their low heat generation, low power consumption, and long life. Additionally, it facilitates the control or management of illuminance or the irradiation amount.

The light source 31 preferably emits light having a peak wavelength of 380 nm or greater and 485 nm or less. Such a configuration allows light having the peak wavelength of 380 nm or greater and 485 nm or less and emitted from the light source 31 to exit without passing through the wavelength conversion layer 4, which is advantageous for the growth of plants because light of a wavelength of 380 nm or greater and 485 nm or less is needed during germination of plants.

Composite Optical Member

Preferably, in the composite optical member 201, the optical member 111 is configured to emit light having a peak wavelength of 610 nm or greater and 650 nm or less, and the second optical member 112 is configured to emit light having a peak wavelength of 380 nm or greater and 485 nm or less.

Because the wavelength range of light needed during germination of plants is in the range from 380 nm to 485 nm, and the wavelength range of light needed during the growth phase of plants subsequent to germination is in the range from 610 nm to 650 nm, the lighting device 301 that can emit light having the above peak wavelengths is useful as the lighting for growing plants.

In the composite optical member 201, the surface roughness (Ra) of the surface of the first light guide member 1 preferably increases as the distance from the light source 31 increases. Similarly, the surface roughness of the surface of the second light guide member 11 preferably increases as the distance from the light source 31 increases. For example, in a case in which the light source 31 is disposed only on one end surface side of the composite optical member 201, the surface roughness of the surfaces of the first light guide member 1 and the second light guide member 11 increases from the end surface of the composite optical member 201 at the light source 31 side toward the other end surface of the composite optical member 201. Also, in a case in which the light source 31 disposed on sides of both end surfaces of the composite optical member 201, the surface roughness of the surfaces of the first light guide member 1 and the second light guide member 11 increases from both end surfaces toward the longitudinal center. By increasing the surface roughness of the surfaces of the first light guide member 1 and the second light guide member 11 as the distance from the light source 31 increases, the proportion of light emitted from the lateral surfaces at a distance from the light source 31 increases, and the difference in intensity of light emitted from the lighting device 301 in the longitudinal direction can be reduced.

The first light guide member 1 of the composite optical member 201 preferably contains the light diffusion material, and the content of the light diffusion material in the first light guide member 1 increases as the distance from the light source 31 increases. Similarly, the second light guide member 11 preferably includes the light diffusion material, and the content of the light diffusion material in the second light guide member 11 increases as the distance from the light source 31 increases. For example, the light source 31 disposed only on one end surface side of the composite optical member 201 increases the content of the light diffusion material in the first light guide member 1 and the second light guide member 11 from the end surface of the light source 31 side toward the other end surface. Also, in a case in which the light source 31 is disposed on both end surfaces side of the composite optical member 201, the content of the light diffusion material in the first light guide member 1 and the second light guide member 11 increases from both end surfaces toward the center in the longitudinal direction. By increasing the content of the light diffusion material in the first light guide member 1 and the second light guide member 11 as the distance from the light source 31 increases, the proportion of light emitted from the lateral surfaces at positions away from the end surface of the light source 31 increases, and the difference in intensity of the light emitted from the lighting device 301 in the longitudinal direction can be reduced.

Light Shielding Plate

The light shielding plate 32 can be a part of the switching device configured to switch the incident destination of light emitted from the light source 31 to either the first light guide member 1 or the second light guide member 11. The light shielding plate 32 is positioned between the light source 31 and either the first light guide member 1 or the second light guide member 11, and is movable to block light from entering either the first light guide member 1 or the second light guide member 11. For example, as illustrated in FIG. 6A, in a case in which the light shielding plate 32 faces the end surface of the first light guide member 1, incidence of light into the first light guide member 1 is blocked, allowing the light to be emitted only from the second optical member 112. When the light shielding plate 32 faces the end surface of the second light guide member 11, incidence of light into the second light guide member 11 is blocked, allowing the light to be emitted only from the optical member 111.

The switching device is not particularly limited, but needs to be able to switch the incident destination of light between the first light guide member 1 and the second light guide member 11.

THIRD MODIFIED EXAMPLE

Figure 7:
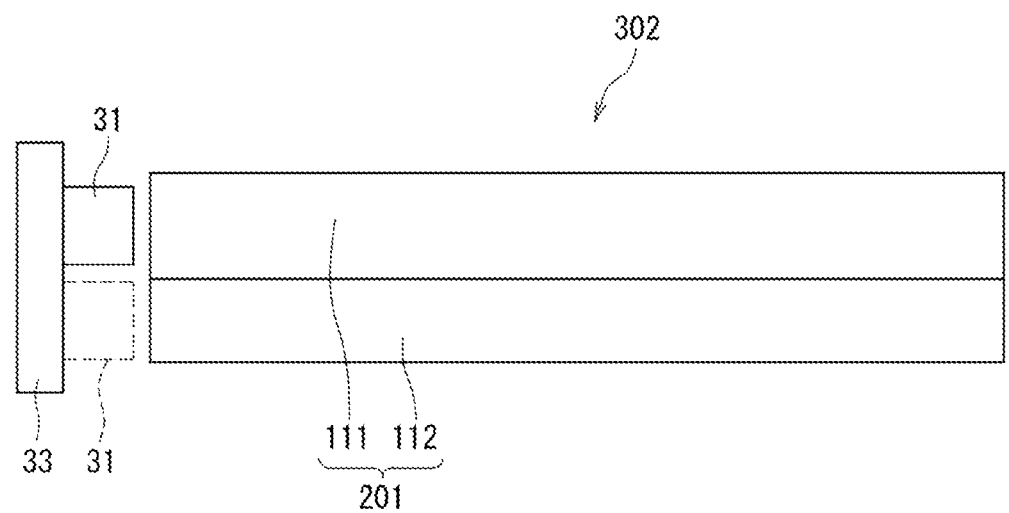
FIG. 7 is a schematic plan view of an exemplary lighting device according to a third modified example of the third embodiment.

As illustrated in FIG. 7, in a lighting device 302 according to a third modified example, a switching device 33 is configured to move the light source 31 to a position facing the end surface of the first light guide member 1 or the end surface of the second light guide member 1, which allows for switching a member on which light emitted from the light source 31 is to be incident. Specifically, the switching device 33 moves the light source 31 from a position facing the end surface of the optical member 111 (indicated by solid line in FIG. 7) to a position facing the end surface of the second optical member 112 (indicated by dashed line in FIG. 7), or vice versa.

Although the lighting device having the composite optical member of the present disclosure has been described in the third embodiment, the composite optical member can be replaced with the optical member of the present disclosure in the lighting device of the present disclosure.

The lighting device according to the present disclosure can be used for various applications, and is particularly suitable for lighting for growing plants.

When used as the lighting for growing plants, it is preferable to use the optical member according to the first modified example of the first embodiment as the optical member 111 and the second optical member 112, thus providing the lighting device that can illuminate mainly the lower predetermined range, that is, the portion corresponding to the ridges where plants are grown.

What is claimed is:

1. An optical member comprising:
a first light guide member having an elongated shape and comprising an end surface and a lateral surface extending in a longitudinal direction from the end surface; and
a wavelength conversion layer disposed on the lateral surface of the first light guide member and containing a phosphor, wherein
the phosphor has a first composition containing an alkali metal containing K, and Si, Al, Mn, and F, wherein
in the first composition, when a total number of moles of the alkali metal is 2, a total number of moles of Si, Al, and Mn is 0.9 or greater and 1.1 or less, a number of moles of Al is greater than 0 and 0.1 or less, a number of moles of Mn is greater than 0 and 0.2 or less, and a number of moles of F is 5.9 or greater and 6.1 or less, and
the phosphor has a cubic system crystal structure and a lattice constant of 0.8138 nm or greater.

2. The optical member according to claim 1, wherein the phosphor has an angle of repose that is 50 degrees or greater.

3. The optical member according to claim 1, wherein the wavelength conversion layer is disposed in a region between one end or its vicinity of the first light guide member and the other end or its vicinity of the first light guide member.

4. The optical member according to claim 1, wherein the wavelength conversion layer is disposed on a portion of the lateral surface of the first light guide member that is visible from at least one direction.

5. The optical member according to claim 1, wherein the wavelength conversion layer is disposed over the entire periphery of the lateral surface of the first light guide member.

6. The optical member according to claim 1, wherein the first light guide member has a cylindrical shape.

7. The optical member according to claim 1, wherein a surface roughness (Ra) of a surface of the first light guide member is 0.2 μm or greater and 1.0 μm or less.

8. The optical member according to claim 1, wherein the first light guide member contains a light diffusion material.

9. The optical member according to claim 1, wherein the first light guide member contains a silicone resin, a silicone-modified resin, an epoxy resin, a phenol resin, a polycarbonate resin, an acrylic resin, a methylpentene resin, or a polynorbornene resin.

10. A composite optical member comprising:
the optical member according to claim 1; and
a second optical member configured to emit light having a wavelength different from a wavelength of the optical member, wherein
the second optical member is a second light guide member having an elongated shape and including an end surface and a lateral surface extending in a longitudinal direction from the end surface.

11. The composite optical member according to claim 10, wherein
no wavelength conversion layer is provided on the lateral surface of the second light guide member.

12. The composite optical member according to claim 10, wherein
the first light guide member and the second light guide member are arranged in parallel.

13. The composite optical member according to claim 12, wherein the optical member is in contact with the second optical member.

14. The composite optical member according to claim 10, wherein
the second light guide member comprises a resin identical to the resin contained in the first light guide member.

15. A lighting device comprising:
the composite optical member according to claim 10; and
a light source facing an end surface of the optical member or an end surface of the composite optical member.

16. The lighting device according to claim 15, wherein the light source is configured to emit light having a peak wavelength that is 380 nm or greater and 485 nm or less.

17. The lighting device according to claim 15, wherein
a surface roughness of a surface of the first light guide member increases as a distance from the light source increases.

18. The lighting device according to claim 15, wherein
the first light guide member contains a light diffusion material, and a content of the light diffusion material in the first light guide member increases as a distance from the light source increases.

19. The lighting device according to claim 15, wherein:
the optical member is configured to emit light having a peak wavelength that is 610 nm or greater and 650 nm or less, and
the second optical member emits light having a peak wavelength that is 380 nm or greater and 485 nm or less.

20. The lighting device according to claim 15, wherein
the first light guide member and the second light guide member are arranged in parallel, and
the lighting device further comprising:
a switching device configured to switch between the first light guide member and the second light guide member as a member on which light emitted from the light source is incident.

21. The lighting device according to claim 20, wherein
the switching device comprises a light shielding plate, and
the light shielding plate shields light incident on either the first light guide member or the second light guide member to switch between the first light guide member and the second light guide member as the member on which light emitted from the light source is incident.

22. The lighting device according to claim 20, wherein
the switching device is configured to switch between the first light guide member and the second light guide member as the member on which light emitted from the light source is incident by moving the light source to a position facing an end surface of the first light guide member or to a position facing an end surface of the second light guide member.

23. The lighting device according to claim 15, wherein
the light source is disposed with respect to one end surface of the composite optical member.

24. The lighting device according to claim 15, wherein
the light source faces both end surfaces of the composite optical member.

25. The lighting device according to claim 15, wherein
the lighting device is used for growing plants.

26. A lighting device comprising:
the optical member according to claim 1; and
a light source facing an end surface of the optical member or an end surface of the composite optical member.

27. The lighting device according to claim 26, wherein
the light source is configured to emit light having a peak wavelength that is 380 nm or greater and 485 nm or less.

28. The lighting device according to claim 26, wherein
a surface roughness of a surface of the first light guide member increases as a distance from the light source increases.

29. The lighting device according to claim 26, wherein
the first light guide member contains a light diffusion material, and a content of the light diffusion material in the first light guide member increases as a distance from the light source increases.

30. The lighting device according to claim 16, wherein
the light source is disposed with respect to one end surface of the optical member.

31. The lighting device according to claim 16, wherein
the light source faces both end surfaces of the optical member.

32. The lighting device according to claim 16, wherein
the lighting device is used for growing plants.

* * * * *